United States Patent [19]
Voituriez

[11] Patent Number: 4,925,688

[45] Date of Patent: May 15, 1990

[54] METHOD OF DIFFUSING ESSENTIAL OILS AND OLEO-RESINS OF SPICES IN A CARRIER SOLUTION

[76] Inventor: Daniel Voituriez, 56 rue Gambetta, 59320 Haubourdin, France

[21] Appl. No.: 241,929

[22] Filed: Sep. 8, 1988

[51] Int. Cl.$^5$ .............................................. A23L 1/226
[52] U.S. Cl. ..................................... 426/281; 426/651
[58] Field of Search ................ 426/651, 281, 602, 641

[56] References Cited

U.S. PATENT DOCUMENTS

| | | | |
|---|---|---|---|
| 2,282,808 | 5/1942 | Musher | 426/651 |
| 3,041,180 | 6/1962 | Swisher | 426/651 |
| 3,464,231 | 9/1969 | Ziegler | 426/651 |
| 3,615,689 | 10/1971 | Malinow | 426/281 |
| 3,615,702 | 10/1971 | Surshei | 426/602 |
| 3,644,127 | 2/1972 | Moores | 426/651 |
| 3,906,116 | 9/1975 | Quesnel | 426/651 |
| 4,038,426 | 7/1977 | Jepersen | 426/281 |
| 4,508,744 | 4/1985 | Kruger | 426/658 |
| 4,663,173 | 5/1987 | Clatfelter | 426/281 |
| 4,786,515 | 11/1988 | Muller | 426/281 |
| 4,835,002 | 5/1989 | Wolf | 426/651 |

*Primary Examiner*—Carolyn Paden
*Attorney, Agent, or Firm*—Collard, Roe & Galgano

[57] ABSTRACT

A method of diffusing essential oils and oleo-resins in a carrier solution is disclosed. The resulting product is applicable for preparing seasonings in the pork a product industry. The essential oils are obtained by distilling the spices, and the oleo-resins are the evaporation residues of the dissolution of spices in a solvent. According to the desired concentration of the diffusion contemplated, the essential oils and the oleo-resins are reduced by the action of a high pressure followed by a sudden expansion. The presence of an emulsifier in the mixture prevents the microparticles from reforming a mass. The homogeneity of the mixture is obtained by forming an emulsion by stirring. The invention is applicable more particularly to the food industry in general.

11 Claims, 1 Drawing Sheet

METHOD OF DIFFUSING ESSENTIAL OILS AND OLEO-RESINS OF SPICES IN A CARRIER SOLUTION

BACKGROUND OF THE INVENTION

1. Field of the Invention

The present invention relates to a method of diffusing essential oils and oleo-resins of spices in a carrier solution which is applicable notably in the field of pork in its various forms, whether fresh, dried or cooked, for preparing seasoning, flavoring or condiment products for ham, meat-pies, sausages and the like, as well as for vacuum-prepared dishes and beverages.

2. The Prior Art

The important part played by spices for improving the flavor of culinary dishes and notably in the field of pork in its various forms is well known. This method of seasoning food is nowadays a primary requirement which permits of determining the gradations and flavor of a food or dish.

The use of spices goes back a very long time and their dosage and distribution constitute a difficult art.

For many centuries various methods have been proposed for extracting sapid or aromatic principles from spices, condimentary plants, aromatic plants, and also from non-vegetable substances selected in the mineral or animal kingdom.

The maceration process is also known in the art. It consists in causing the substance from which it is desired to extract the active principles to contact a cold solvent during a predetermined time period After dividing the product while stirring the mixture from time to time, a liquid product is obtained. This method is used for extracting a heat-alterable active principle (e.g. liquorice), the solvent consisting simply of water.

The infusion method is also well known: it consists in pouring a boiling liquid, for instance water, on a substance from which it is desired to extract the active principle and allowing the infusion to cool down as such. This method is used with products having delicate tissues such as plant leaves or flowers, which contain volatile principles (e.g. flower or leave infusions or decoctions).

The digestion method is also known which consists in keeping the substance in contact with a solvent, for instance water, at a relatively high temperature but below the boiling point. Thus, a "digested" product is obtained. This method is used for substances of which the active principles would be destroyed if allowed to boil, but which are not extracted in the cold state (e.g. animal extracts).

Decoction is also a familiar method which consists in keeping a substance in contact with a solvent, for instance water, heated to and kept at its boiling point during a predetermined time period. This method is used for treating substance from which it is desired to extract certain active principles, without preserving its volatile principles.

Lixiviation or leaching is another exhaustion method consisting in pouring a solvent (for instance water) on a pulverized substance forming a more or less thick bed from which the active principles are carried away by displacement. This operation is based on the principle that the solvent flowing through a substance forming a bed or layer will become gradually loaded with dissolved substances which are carried away as the flow is maintained, to permit the complete exhaustion of the active principles.

Various searches proved that spices contain many component elements which can be classified in two groups, each group having a specific character. These groups of component elements may be evidenced and individualized by using suitable technical methods.

Firstly, one may distinguish the essential oils imparting its specific perfume to the spice.

The other group of constituents comprises oleo-resins which determine the spice flavor.

The possibility of separating the flavor from the perfume is a capital asset since it permits of modulating separately the two parameters characterizing the spice.

The essential oil can be extracted from the spice by distillation. In contrast thereto, oleo-resins are obtained by pulverizing the spice in a solvent in which it will be kept during the time necessary for dissolving the oleo-resins, and subsequently evaporating the solvent to yield a residue constituting in fact the desired oleo-resins, i.e. the spice flavor or taste.

Among the many solvents suitable for carrying out this distillation, alcohol, heptane, methylene or butane chloride, toluene methanol ketones petroleum ether or other ethers, as well as supercritical solvents may be used.

In the case of pepper, the very strong oleo-resin obtainable therefrom contains 40% of pepper alkaloid piperine.

Of course, the possibility of proportioning separately the taste and fragrancy obtained from spices is rather attractive. However, by reason of their strong concentration, it is necessary to dilute the spices in a suitable solution that can subsequently be utilized directly in recipes.

Firstly, it is known to use alcohol for preparing a carrier solution. The oleo-resins contained in the pulverized spices are dissolved in the alcohol medium which can thus carry the dissolved oleo-resins.

However, this technique is attended by various inconveniences. More particularly, the use of alcohol implies many restrictions from the legal standpoint. Furthermore, when the oleo-resins loaded concentrations are to be diluted in water, the assimilation of alcohol in water and the precipitation of the oleo-resins are observed. Therefore, the final mixture is definitely not homogeneous and causes important changes of taste in the preparation to be seasoned.

On the other hand, not all oleo-resins are soluble or dispersible in alcohol. Therefore, other solvents must be used. Thus, for instance, rosemary oleo-resin can be dispersed in fatty oil but not in alcohol.

In this respect it is worth remembering that in many cases water is used as the dissolving medium for obtaining the desired concentration of seasoned liquid. Consequently, the fact that neither essential oils, nor oleo-resins are soluble in water constitutes a major inconvenience.

One may also use a pulverulent support as a carrier medium for the essential principles of spices. In this respect, salt, sugar or food glutamate in powder form may be used. This solution is attended however by an addition of external flavor likely to impair or alter the spice action or effect.

It may also be observed that in the drysalter industry nitrited salt is used in substantially all cases, thus yielding a salted products having a specific pink color. Dispersing the spice oleo-resins or essential oils on salt to avoid an excessively pronounced salted flavor would make it compulsory to reduce the proportion of nitrited salt to the prejudice of the product color.

Besides, dispersing the spice oleo-resins and essential oils on sugar would compel the user to reduce the sugar proportion employed. Now, sugar is the cheapest "load" in a food salting process.

Finally, dispersing oleo-resins or essential oils on glutamate, a relatively expensive product the use of which is prohibited in all foods made from pork, notably in first-quality ham, would not constitute the solution sought by the users.

Moreover, though water, salt or sugar are well assimilated by human organisms in general, oleo-resins form a precipitate, thus impairing the homogeneity of the solution.

Nowadays, it is very difficult to control the essential principles of spices because it is not possible to control with a sufficient degree of precision the homogeneity of a solution carrying essential oils and oleo-resins at the time of its actual use.

Considering the economical pressure exerted on the food industry, which has improved considerably in the field of pork products, it is nowadays necessary to exert a perfect and reliable control of the specific function devolved to each component element of spices. Under these conditions, it is of primary importance to be able to control not only each one of the various factors conditioning the taste, fragrancy and flavor of a product, but also the technical processes utilized in its manufacture and which must be perfectly mastered from the industrial point of view.

SUMMARY OF THE INVENTION

It is the primary object of the present invention to provide a method of diffusing essential oils and oleo-resins of spices in a carrier solution, while obtaining an end product of which the homogeneousness is particularly satisfactory. Under these conditions, production on an industrial scale can be contemplated since a guarantee is obtained as to the stability and balance of the taste and fragrancy of the food seasoned with this solution.

This possibility of operating on a large scale permits of reducing manufacturing costs, inasmuch as the technical method of the present invention can be carried out by using standard equipments.

It is another object of the present invention to provide a diffusion method permitting the preparation of food products on a commercial scale, these products being similar to those of old-time, traditional recipes which up to now had to be abandoned on account of the very long preparation time required for carrying out such recipes.

For instance, the manufacture of ham in the old way, requiring a three-week prickling phase followed by boiling in a broth containing seasoning herbs and aromatics, is nowaday completely obsolete and relinquished. Now this is the more to be regretted that this ham was a high-quality product having a particular flavor.

With the method of the present invention a product similar to old-day ham, compatible with present-day economical requirements, i.e. a short preparation and storage time, can be obtained.

Another advantage characterizing the present invention lies in a considerable improvement from the point of view of hygiene. In fact, the spices now currently available in powder form are strongly polluted and contaminated. With the method of the present invention, the product is sterilized by effecting a cellular grinding of the various yeasts and microbs contained therein, and also of their spores. Besides, the product obtained in liquid phase can easily be pasteurized for completing its sterilization.

Other objects and advantages of the present invention will appear as the following description proceeds with reference to specific forms of embodiment given by way of example, not of limitation.

The method of diffusing essential oils and oleo-resins of spices in a carrier solution intended notably for preparing a seasoning in the field of pork products or vacuum dishes or meals, the essential oils being obtained notably through the distillation of spices, the oleo-resins consisting notably of the evaporation residues of a dissolution of the spices in a solvent, is characterized in that:

a first homogeneous solution of a mixture of fatty oil, essential oil and oleo-resin of the spices is prepared at the concentration level contemplated for the actual use of the diffusion to be obtained, this first solution of fatty oil, essential oil and oleo-resin is mixed in a colloidal carrier solution, the resulting mixture is emulsified by stirring energetically, and the resulting emulsion is homogenized by reducing the oils and oleo-resins to micron-size microdroplets.

THE DRAWINGS

FIG. 1 illustrates diagrammatically the various steps of the diffusion method of the present invention, and FIG. 2 is a detail view showing the microscopic elements in the diffusion carrier solution of the present invention.

DESCRIPTION OF THE PREFERRED EMBODIMENTS

Figure 1:
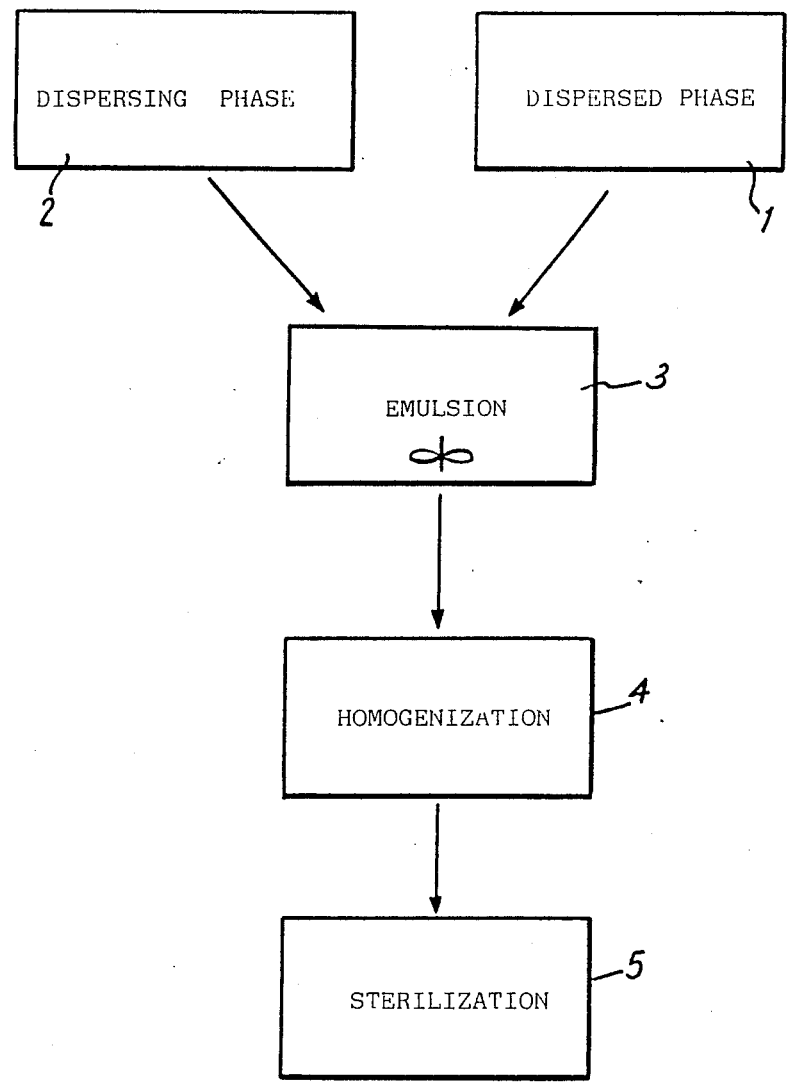

The present invention is directed to a method of diffusing essential oils and oleo-resins of spices in a carrier solution. It is applicable notably in the field of pork products and/or vacuum meals or dishes for constituting the seasonings necessary for obtaining the flavor of culinary dishes.

In the matter of industrial food cooking it is necessary to combine a good quality of the end product with economy factors.

To properly control the taste and fragrancy of these commercial products, one must know the influence exerted by each ingredient introduced into the recipe. Now, in this specific field, the part played by spices is preponderant.

Exhaustive searches have proved that it was possible to distinguish in the very heart of a spice the elements exerting an influence on taste, and the elements exerting an influence on fragrancy.

More particularly, essential oils constitute a determinant factor with respect to fragrancy, whereas oleo-resins characterize the taste.

Some known technical processes permit of extracting from spices the essential principles which can thus be used separately for improving the taste and fragrancy of pork products, for example.

However, due to their strong concentration, these essential oils and oleo-resins are not used in their purest form and must necessarily be diluted in a carrier solution suitable for a subsequent practical use.

By distilling the spice, an essential oil which is the "perfume", scent or fragrancy of the spice is obtained.

By dissolving the pulverized spice in a solvent such as alcohol, heptane, methylene chloride, butane, toluene, methanol, ketone, petrol ether or else, the oleo-resing can be dissolved and subsequently recovered in the form of a residue by evaporating the solvent. These oleo-resins yield the spice taste.

In any case, it is necessary to subsequently take a support for carrying the oleo-resins. Up to now, either alcohol or a pulverulent carrier was used for this purpose.

The inconvenience of alcohol is its solubility in water and therefore when the mixture is diffused in water the oleo-resins form a precipitate, thus destroying the homogeneity of the concentration, and on the other hand alcohol cannot dissolve all oleo-resins.

When a pulverulent carrier such as sugar, salt or glutamate is used, there is a risk of introducing this substance into the recipes, thus changing the taste. On the other hand, these pulverulent carriers are water-soluble, in contrast to oleo-resins which precipitate when diffused in water.

With the method of the present invention, the essential principles are extracted from spices by using the distillation technique in the case of essential oils and the evaporation technique (after dissolving the spices in a solvent) in the case of oleo-resins. However, it is worth remembering that in this respect other separation techniques within the reach of the man of the Art may also be used for decomposing the spices.

Firstly, in the diffusion method of the present invention, a first homogeneous solution is formed by mixing (according to the desired concentration of the diffusion to be obtained) the fatty oils, the essential oils and the oleo-resins extracted from the spices. This first step, called the "Dispersed Phase", is shown at 1 in FIG. 1 of the drawing.

Moreover, it will be seen that according to the consistency of the oleo-resins implemented, said first solution may advantageously be heated to a temperature of about 50° C. to facilitate their liquefaction and consequently improve the homogeneousness of the solution.

Then, a second colloidal carrier solution is prepared as shown diagrammatically at 2 in FIG. 1, which is the "Dispersing Phase".

This colloidal carrier solution is obtained in France by using authorized emulsifiers such as acacia gum (gum arabic) in water. Then this solution is allowed to swell during a relatively long time period, for instance, of the order of four hours.

However, it may be noted that other emulsifiers prohibited in France but authorized in other Countries, such as sorbitan monolaurate, sorbitan monostearate, polyoxyethylene sorbitan monolaurate, polyoxyethylene sorbitan monostearate, sorbitan stearate may also be used. Such emulsifiers are suitable for carrying out the method of the present invention.

During the next step, as illustrated diagrammatically in phase 3 of FIG. 1, the fatty oil, essential oil and oleo-resin solution is mixed with the colloidal carrier solution.

However, beforehand and to avoid any undesired precipitation during this mixing step, which might result from the temperature difference between the two solutions, the carrier solution is heated to a temperature approximating that of the fatty oil, essential oil and oleo-resin solution, i.e. about 50° C.

Then, this mixture is emulsified by stirring strongly until a so-called "bleaching" solution is obtained. During this step, the spice essential oils and oleo-resins are dispersed.

In comparison with the conventional methods, in the method of the present invention no particular dissolving medium is used for the oleo-resins which are introduced directly into the colloidal carrier solution.

The non-miscible essential oils occur in the form of drops whereas the oleo-resins occur in the form of relatively coarse, non-watersoluble microdroplets.

Any attempt to homogenize the resulting mixture as such would be unsuccessful and considerable variations in the concentration level are recorded in actual practice.

The next step of the method consists in homogenizing the emulsion thus obtained, as shown diagrammatically at 4 in FIG. 1. During this step, the spice essential oils and oleo-resins are reduced to micron-size microdroplets. The homogeneity of the concentration is not complete. However, the mass of microdroplets in the colloidal carrier solution are akin to a liquid medium.

The microdroplets are prevented from reconstituting a mass. In fact, it is essential to preserve the diffused condition of the microparticles in the carrier solution so that a satisfactory homogeneity of the diffusion can be obtained.

The reduction of the oleo-resin residues and of the oil droplets into microdroplets is obtained by subjecting the mixture to a relatively high pressure followed by a sudden pressure release.

By adopting a pressure approximating 450 bars and an expansion down to about one bar, it is possible to break the oleo-resin fragments into microdroplets, actually of a size less than one micron.

Thus, a homogeneous emulsion is obtained in which essential oil microdroplets and oleo-resin microdroplets are distributed throughout. In fact, the homogeneity of the final emulsion is warranted by the size of the microdroplets in conjunction with a broad diffusion thereof.

On the other hand, the emulsion 4 (FIG. 1) thus obtained is perfectly homogeneous and can be utilized directly as such since its component elements have been proportioned according to the concentration contemplated for the future use of the emulsion.

One of the difficulties encountered lies in the fact that it is necessary to prevent any subsequent reconstitution into a mass of the microdroplets thus separated.

This object is attained by decreasing the surface tension of the colloidal carrier solution to prevent any regrouping of the microdroplets.

This change in the surface tension is also effective in the case of essential oils which, when broken into fine droplets, remain likewise in this state.

A change in the surface tension, as explained in the foregoing, is obtained by charging the carrier solution with an emulsifier, notably in France by resorting to the synergetic association of acacia gum (gum arabic).

Figure 2:
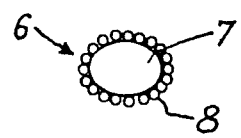

The emulsifier assimilated to the carrier solution covers each microdroplet by adhering to the surface thereof, as illustrated in FIG. 2.

In this FIG. 2, as shown in a very approximate, manner, the emulsion consists of a great number of microdroplets 6, in fact microdrops of oil and/or microdroplets of oleo-resins 7 wrapped in a peripheral coat S of emulsifier microdroplets.

Moreover, upon completion of the two homogeneization and sterilization steps, the diffusion temperature thus obtained will advantageously be reduced substantially to room temperature level (e.g. about 18° C.) to permit the packaging of the product by using conventional methods.

By way of example, the oil or oleo-resin microparticles have a maximum diameter of $10^{-6}$ millimeters, whereas the diameter of the emulsifier microdroplets lies in the range of $10^{-7}$ to $10^{-9}$ millimeters.

As a result of the cooperation between the emulsifier, the oil microdroplets and the oleo-resin microdroplets, all the microdroplets can subsist within the carrier solution in spite of their different densities.

On the other hand, according to the present invention, the thus homogenized solution is sterilized by applying to the mixture a second strong compression followed by a sudden expansion. As a consequence of this second compression, the cells of the microbial organisms such as yeasts and/or bacteria are destroyed and the resulting product will be perfectly sterile due to the cellular bursting thus produced.

This sterilization is carried out during step 5 (shown diagrammatically in FIG. 1) by applying a pressure of about five hundred bars, followed by an expansion down to about one bar.

By carrying out the method of the present invention a seasoning suitable for use notably in the field of pork meat and/or vacuum dishes can be obtained, this seasoning having the form of a perfectly homogeneous and sterile emulsion suitable for use either in a solution, for instance in water or salt, or directly as such.

By way of example, good results have been recorded by carrying out the method of obtaining the oleo-resins cum essential oils emulsion of the present invention as follows:

the emulsifier is dispersed while stirring for instance in water constituting the carrier solution. More particularly, from twenty to sixty kilograms of a synergetic association of gum arabic are dispersed in about one-thousand liters of water and allowed to swell during four hours, a mixture of fatty oils such as soya-bean, sunflower or peanut oil, with oleo-resins and essential oils selected as a function of the product to be obtained, is prepared, and as a bunch of aromatic plants the oleo-resins and the essential oils of thyme, laurel, onions, carrots and cloves are used. Then, this mixture is heated to a temperature of about 50° C. while stirring to impart the necessary homogeneity thereto, this mixture is added to the emulsifier-containing water and stirred until a pre-emulsion is obtained, this step being continued until the pre-emulsion is "bleached", care being taken that the water and emulsifier mixture be also kept at a temperature of about 50° C. before incorporating it, to avoid any conglomeration of certain oleo-resins such as pepper, curcuma, thyme or laurel, finally, the emulsion is homogenized in a high-pressure, two-stage apparatus capable of raising the pressure to values of the order of 450 to 500 bars.

With this method, the resulting emulsion is perfectly homogeneous and when seen through the microscope it displays a satisfactory regularity, the microdroplets of essential oils and the microdroplets of oleo-resins having a diameter substantially less than one micrometer (um).

At present, the manufacture of "old time" ham consists in dipping the ham into nitrated brine during three weeks. The brine consists of a mixture !of salt, such as potassium nitrate, and sugar. During the salting step, the bacteria convert the nitrate into nitrites which combine with ham haemoglobin and myoglobin, and impart a pinky color thereto.

At the end of the salting period, the ham is cooked by boiling, the broth containing a bunch of aromatic plants and other aromatics. Thus, the ham is impregnated down to the heart with the spices.

Considering the present industrial imperatives, and the fact that the manufacture of ham has nowadays changed considerably, the so-called "pumping" brine consisting of water, nitrited salt and sugar is injected directly into the ham. Then, the ham is "churned" and subsequently cooked in a mold in vacuo. Obviously, the time-saving is thus considerable, yet the absence of cooking in broth results in the lack of the additional flavor contribution resulting from the presence of the bunch of aromatic plants of the old method.

With the method of the present invention it is possible to obtain an instantaneous and stable dissolution of an emulsion derived from a bunch of aromatic plants in the brine, this emulsion being subsequently injected into the ham. Thus, without any loss of time, the ham is aromatized directly as in the "old time" preparation.

By way of example, an "old time" ham can be obtained according to the present invention by dissolving one liter of an aromatic plant bunch solution obtained according to the method of the invention in about two hundred liters of brine, so that it is possible to aromatize the ham without any change in the above-described conventional industrial method.

Besides, the present invention can be carried out in other branches of the pork meat industry, for example in the production of sausages, tripes, pork-head pies, and the like.

A few examples will now be described for a better understanding of the invention, it being understood that these examples should not be regarded as limiting the scope of the invention.

In the preparation of sausages, for instance the so-called "Sausisson de Paris Ail" (Paris Garlic Sausage), substantially one liter of a suitable seasoning emulsion according to the present invention is dissolved in the wetting water utilized in the manufacture of the sausage for about two hundred kilograms of mixed sausage meat In this case, the "Paris Garlic" seasoning will contain the oleo-resins and essential oils necessary for imparting the traditional taste to the product.

In the case of "dry sausage" and/or "salami", the manufacture of which does not require the use of water, a specific amount of seasoning prepared according to the present invention is added to, and thoroughly mixed with, the mixture, in suitable proportions. Thus, the use of strongly polluted and non-sterile natural spices can be avoided.

According to the same principle, in the preparation of tripes, pork-head pies, and the like, which are generally cooked in water, one can also incorporated the aromatic plant bunch emulsion, notably during the last hour of the cooking period, so that a perfect and quick diffusion of the seasoning principles will be obtained Of course, other forms of embodiment of the present invention may occur to those conversant with the Art without departing from the basic principles of the invention, notably in the case of the preparation of dishes cooked in vacuo.

What is claimed as new is:

1. A process for diffusing essential oils and oleo-resins of spices in a carrier solution, comprising the steps of:
   (a) forming a homogeneous first solution of a mixture of fatty oils, essential oils and oleo-resins of the spices, according to the desired concentration of the diffusion to be obtained;
   (b) forming a colloidal-bearing second solution containing at least one emulsifier;
   (c) vigorously mixing said first solution with said second solution so that the resultant mixture is emulsified producing an emulsion in which said essential oils and oles-resins of the spices are dispersed;
   (d) homogenizing said emulsion by initially subjecting said emulsion to a relatively high pressure and then subjecting said emulsion to a relatively sudden venting and release of said pressure so as to reduce said essential oils and oleo-resins to microdroplets with droplet sizes on the order of about one micron or less and to surround said microdroplets with a peripheral layer of said emulsifier so as to prevent any subsequent reconstitution into a mass of said essential oils and oleo-resins.

2. The process of claim 1, additionally including the step of:
   (e) sterilizing said homogenized emulsion, by repeating said homogenizing step (d) under a sufficiently high pressure to effect sterilization thereof.

3. The process of claim 1, wherein said emulsifier used in step (b) is gum of acacia.

4. The process of claim 11, wherein said emulsifier used in step (b) is selected from the group consisting of sorbitan monolaureate, sorbitan monostearate, sorbitan polyoxy-ethylene monolaureate, sorbitan polyoxyethylene monostearate, sorbitan stearate and a mixture thereof.

5. The process of claim 1, wherein in step (d) said relatively high pressure is in the range of 450 to 500 bars and said venting and release of said pressure is accomplished at approximately one bar.

6. The process of claim 1, wherein said mixture formed in step (a) is subjected to a temperature of approximately 50° C. and is homogenized by stirring, wherein step (b) comprises dispersing 20 to 60 kilograms of gum of acacia under stirring into approximately 1,000 liters of water to form a dispersion and then allowing said dispersion to swell for a period of about four hours and and wherein said homogenizing step (d) is performed at a relatively high pressure in the range of 450 to 500 bars.

7. The process of claim 1, wherein said first solution of essential oils and oleo-resins is obtained from aromatic plants and wherein said process additionally includes the step of
   (g) dispersing said homogenized solution in brine and injecting the resulting liquid into a ham to impart an aroma to said ham.

8. The process of claim 1, wherein one liter of said homogenized solution is used.

9. The process of claim 1, additionally including the step of (h) intimately incorporating said homogenized emulsion into a mix of a product selected from the group consisting of a meat product, a pork meat product, a vacuum prepared food product and a beverage to impart a specific seasoning thereto.

10. The process of claim 1, additionally including the step of (i) dispersing said homogenized solution in the cooking water of a culinary preparation to be cooked in said water, and cooking said culinary preparation in said cooking water so treated so as to impart an aroma or taste thereto.

11. The process of claim 1, wherein said emulsifier has a droplet size of less than one micron.

* * * * *